United States Patent
Bierwirth

(10) Patent No.: US 12,194,949 B2
(45) Date of Patent: Jan. 14, 2025

(54) GAS GENERATOR, AIRBAG MODULE, VEHICLE SAFETY SYSTEM AND METHOD FOR OPERATING GAS GENERATOR

(71) Applicant: ZF AIRBAG GERMANY GMBH, Aschau a. Inn (DE)

(72) Inventor: Sebastian Bierwirth, Rechtmehring (DE)

(73) Assignee: ZF AIRBAG GERMANY GMBH, Aschau a. Inn (DE)

( * ) Notice: Subject to any disclaimer, the term of this patent is extended or adjusted under 35 U.S.C. 154(b) by 0 days.

(21) Appl. No.: 17/289,479

(22) PCT Filed: Oct. 18, 2019

(86) PCT No.: PCT/EP2019/078360
§ 371 (c)(1),
(2) Date: Apr. 28, 2021

(87) PCT Pub. No.: WO2020/083773
PCT Pub. Date: Apr. 30, 2020

(65) Prior Publication Data
US 2021/0394704 A1 Dec. 23, 2021

(30) Foreign Application Priority Data
Oct. 23, 2018 (DE) .................... 10 2018 126 277.9

(51) Int. Cl.
*B60R 21/261* (2011.01)
*B60R 21/272* (2006.01)
*B60R 21/26* (2011.01)

(52) U.S. Cl.
CPC .......... *B60R 21/272* (2013.01); *B60R 21/261* (2013.01); *B60R 2021/26011* (2013.01); *B60R 2021/2612* (2013.01)

(58) Field of Classification Search
CPC ... B60R 2021/26011; B60R 2021/2642; B60R 2021/2648
See application file for complete search history.

(56) References Cited

U.S. PATENT DOCUMENTS 4,437,681 A * 3/1984 Adams ...................... B01J 7/00
280/733
4,998,751 A * 3/1991 Paxton ................ B60R 21/2644
280/741

(Continued)

FOREIGN PATENT DOCUMENTS

CN 105196960 A 12/2015
CN 107264463 A 10/2017

(Continued)

OTHER PUBLICATIONS

International Search Report for corresponding International Application Serial No. PCT/EP2019/078360, mailed Jan. 23, 2020, 1 page.

(Continued)

*Primary Examiner* — Barry Gooden, Jr.
(74) *Attorney, Agent, or Firm* — Tarolli, Sundheim, Covell & Tummino LLP

(57) ABSTRACT

The invention relates to a gas generator (100), especially for a vehicle safety system, comprising an exterior housing (34), an igniter unit (38) having an igniter (42), a combustion chamber (14) having fuel bodies (18, 24), the combustion chamber being arranged axially downstream of the igniter unit (38), at least one filter unit (10) being arranged within the combustion chamber (14), which filter unit (10) divides the combustion chamber (14) along a longitudinal axis (La) of the gas generator (100) into a first combustion chamber portion (15) having a first number of first fuel bodies (18)

(Continued)

and at least one additional combustion chamber portion (20) having an additional number of additional fuel bodies (24).

16 Claims, 2 Drawing Sheets

(56) References Cited

U.S. PATENT DOCUMENTS

| | | | |
|---|---|---|---|
| 5,022,674 A * | 6/1991 | Frantom | B60R 21/272 280/741 |
| 5,536,040 A * | 7/1996 | Cuevas | B60R 21/272 280/741 |
| 5,564,743 A | 10/1996 | Marchant | |
| 5,593,181 A * | 1/1997 | Walker | B60R 21/2644 102/530 |
| 5,628,528 A * | 5/1997 | DeSautelle | B60R 21/2644 280/736 |
| 6,089,598 A * | 7/2000 | Snyder | B01D 46/0049 280/740 |
| 6,474,685 B1 * | 11/2002 | Meixner | B60R 21/2644 280/736 |
| 8,657,974 B1 * | 2/2014 | Mayville | C06D 5/06 149/46 |
| 8,702,125 B1 * | 4/2014 | Smith | B60R 21/2644 280/740 |
| 8,783,188 B1 * | 7/2014 | Mayville | B60R 21/2644 102/530 |
| 2004/0262900 A1 * | 12/2004 | Yoshida | B60R 21/2644 280/741 |
| 2005/0206144 A1 * | 9/2005 | Numoto | B60R 21/2644 280/736 |
| 2006/0005734 A1 * | 1/2006 | McCormick | B60R 21/2644 102/530 |
| 2007/0075535 A1 * | 4/2007 | Trevillyan | B60R 21/272 280/736 |
| 2007/0075536 A1 * | 4/2007 | Kelley | B60R 21/276 280/737 |
| 2007/0085309 A1 * | 4/2007 | Kelley | B60R 21/272 280/736 |
| 2008/0156216 A1 | 7/2008 | Yoshida et al. | |
| 2009/0230664 A1 * | 9/2009 | Hayakawa | B60R 21/2644 280/741 |
| 2009/0261562 A1 * | 10/2009 | Clark | B60R 21/26 280/741 |
| 2010/0253053 A1 * | 10/2010 | Hayakawa | B60R 21/2646 280/736 |
| 2010/0307775 A1 | 12/2010 | Robbins et al. | |
| 2012/0125219 A1 * | 5/2012 | Mayville | C06C 9/00 102/530 |
| 2013/0276663 A1 * | 10/2013 | Ohsugi | B60R 21/2644 102/530 |
| 2013/0291756 A1 * | 11/2013 | Ohsugi | B01J 7/00 102/530 |
| 2014/0230685 A1 * | 8/2014 | Hanano | B60R 21/2644 102/530 |
| 2014/0239623 A1 * | 8/2014 | Tokuda | B60R 21/272 280/737 |
| 2015/0197213 A1 * | 7/2015 | Clark | B01D 46/2403 280/741 |
| 2017/0028964 A1 * | 2/2017 | Bierwirth | B60R 21/2644 |
| 2017/0166162 A1 * | 6/2017 | Last | B60R 21/274 |
| 2017/0259775 A1 * | 9/2017 | Bierwirth | B60R 21/274 |
| 2019/0023220 A1 * | 1/2019 | Takizawa | B60R 21/2644 |
| 2019/0291684 A1 * | 9/2019 | Bierwirth | B60R 21/272 |
| 2021/0402950 A1 * | 12/2021 | Englbrecht | B60R 21/2644 |
| 2024/0092308 A1 * | 3/2024 | Mehnert | B60R 21/2644 |
| 2024/0149825 A1 * | 5/2024 | Huntsman | B01D 39/12 |

FOREIGN PATENT DOCUMENTS

| | | |
|---|---|---|
| DE | 2551920 A1 | 8/1976 |
| DE | 20200401272 U1 | 12/2004 |
| DE | 102004060838 A1 | 7/2005 |
| DE | 102016123312 A1 | 6/2018 |
| JP | S50152986 A | 12/1975 |
| JP | 2005313812 A | 11/2005 |
| JP | 2009179101 A | 8/2009 |

OTHER PUBLICATIONS

DE Search Report for corresponding DE Application Serial No. 10 2018 126 277.9, dated Sep. 26, 2019, 1 page.

* cited by examiner

GAS GENERATOR, AIRBAG MODULE, VEHICLE SAFETY SYSTEM AND METHOD FOR OPERATING GAS GENERATOR

RELATED APPLICATIONS

This application corresponds to PCT/EP2019/078360 filed Oct. 18, 2019, which claims the benefit of German Application No. 10 2018 126 277.9 filed Oct. 23, 2018, the subject matter of which are incorporated herein by reference in their entirety.

BACKGROUND OF THE INVENTION

The invention relates to a gas generator, especially for a vehicle safety system. The invention further relates to an airbag module comprising a gas generator according to the invention, to a vehicle safety system comprising a gas generator according to the invention and to a method for operating a gas generator.

It is known that gas generators include filters or, resp., filter units. Such filters serve especially for withholding slag or fuel particles which are formed upon activation of the gas generator, especially by combustion of a fuel, and can be transported in a gas flow of combustion gas which can be formed inside the gas generator. As is known, such pyrotechnical fuels are fuels which are ignited upon activation of the gas generator by an igniter and then are burnt, and which are frequently in the form of fills or axial lining-ups of individual fuel bodies in the form of a fuel bed. In particular, tubularly elongated gas generators have a relatively long and dense fuel bed disposed in a combustion chamber, which fuel bed is intended to be substantially completely burnt starting from an igniter-side end of the combustion chamber toward a combustion chamber end opposed thereto. Known filters or, resp., filter units are frequently positioned there at the combustion chamber end or at the corresponding end of such elongate fuel bed, especially at a fixedly predetermined position and show the drawback that they must filter the slag or the fuel particles of the whole fuel bed, which may be noticeable as a drawback even there by a relatively small limited total filter capacity. In addition, those structures may limit a high-volume and, resp., very rapid throughput of gas flow at the combustion chamber end by a quite long axial backflow of the gas flow in an undesirably strong way. Accordingly, in addition also a detrimentally high internal pressure or maximum internal pressure value that necessitates a heavier design of a housing of the combustion chamber and, resp., of the gas generator may form in the combustion chamber. It is a further drawback of the afore-described known design that the combustion of such fuel bed which extends, starting from an igniter-side end, continuously over a large axial length to a known end-side filter cannot be substantially influenced or controlled after intended ignition thereof. In other words, when such long continuous fuel bed has been ignited once at a start-side end face, the combustion thereof takes place at a predeterminable constant speed or combustion rate toward the end-side end face without any desired variations such as a deceleration of the combustion or the combustion rate being possible. Finally, those known gas generators have the further drawback that the so-called temperature band of the performance curve of the gas generator exhibits a relatively high spread. In other words, such gas generator exhibits a relatively high variation concerning its gas generation rate as regards its intended operating temperature range.

SUMMARY OF THE INVENTION

Against this background, it is the object of the present invention to state a gas generator which overcomes at least one of the afore-mentioned drawbacks.

It is another object of the invention to state a further developed airbag module and vehicle safety system. In addition, it is the object of the invention to state a further developed method for operating a gas generator which overcomes at least one of the afore-mentioned drawbacks.

In accordance with the invention, this object is achieved, with respect to the gas generator, by the subject matter of claim 1, with respect to the airbag module, by the subject matter of claim 11, with respect to the vehicle safety system, by the subject matter of claim 12 and, with respect to the method for operating a gas generator, by the subject matter of claim 13.

For achieving the afore-mentioned objects, the invention provides a gas generator, especially a gas generator for a vehicle safety system, comprising an exterior housing, an igniter unit having an igniter and a combustion chamber having fuel bodies and being arranged axially downstream of the igniter unit. Within the combustion chamber at least one filter unit is arranged which divides the combustion chamber along a longitudinal axis of the gas generator into a first combustion chamber portion having a first number of first fuel bodies and at least one additional combustion chamber portion having an additional number of additional fuel bodies.

The exterior housing of the gas generator may be a compressed gas container which, in the idle state of the gas generator, i.e., when the latter has not yet been activated as intended, contains a pressurized gas or gas mixture. Hence, the gas generator according to the invention may be a hybrid gas generator which includes, for example, a gas or gas mixture from the group of argon, helium, oxygen or nitrogen, for example at a pressure of 550 bars at room temperature. The combustion chamber may be located inside the compressed gas container and may be interspersed with or include the respective compressed gas, wherein the fuel bodies of the combustion chamber then are equally surrounded by the compressed gas. Moreover, it is also possible, however, for the gas generator to have no compressed gas container including a pressurized gas, wherein then the combustion chamber merely has atmospheric pressure so that, in this case, the gas generator may be a purely pyrotechnical gas generator.

In particular, the gas generator according to the invention may be a so-called tubular gas generator the exterior housing of which substantially corresponds to an elongated tube whose longitudinal extension may be a multiple of the extension in the radial direction. The combustion chamber of the gas generator according to the invention may also be correspondingly configured. The combustion chamber of the gas generator according to the invention may have a relatively large longitudinal extension, wherein especially the length thereof may be a multiple of the diameter and, resp., the width extension thereof. The longitudinal axis of the gas generator extends along and, resp., in parallel to the longitudinal extension of the gas generator.

Due to the gas generator designed according to the invention, the combustion chamber is divided by the at least one filter unit into plural combustion chamber portions, viz. at least into a first and an additional combustion chamber portion, along the longitudinal axis of the gas generator. Hence, in the combustion chamber plural combustion chamber portions having fuel bodies are provided, the combustion chamber portions being located successively in the longitudinal axis and divided by the at least one filter unit, each of which, upon operation of the gas generator, can advantageously be brought into action separately and/or also in relation to each other. It is possible, for example, to effectuate a step-like burning characteristic of the fuel bodies of the different combustion chamber portions one after the other, thus also allowing a corresponding step-like performance curve (gas supply quantity or gas mass flow or pressure development per time unit) of the gas generator, especially a so-called "S slope characteristic" to be obtained. The at least one filter unit provided between a first combustion chamber portion and another combustion chamber portion acts so-to-speak like an ignition brake or an ignition deceleration, as ignition gas by a combustion of the first fuel bodies, considered in terms of both location and time, cannot directly impact on the further fuel bodies of the further combustion chamber portion, but are decelerated or delayed by the filter element so as afterwards to act correspondingly delayed in time for an ignition of the additional fuel bodies. Further advantageously, by the afore-described step-like activation and time-staggered combustion of the first and additional fuel bodies, the internal pressure building up in the combustion chamber can be reduced so that interfering high maximum pressures can be avoided. In addition, advantageously burning products (slag/particles) of fuel bodies of individual combustion chamber portions can be filtered and, resp., cooled by filter units designed specifically for this purpose, which helps achieve optimum filter capacity utilization and increase in efficiency of the individual filter unit(s). Finally, the gas generator according to the invention helps advantageously reduce the variation as regards its gas generation rate and its performance curve with respect to its intended operating temperature range.

Preferably, in the gas generator according to the invention the at least one filter unit is configured to be permeable to gas and/or permeable to particles, wherein at least several of the first fuel bodies are arranged on an igniter-side end face of the at least one filter unit and at least several of the additional fuel bodies are arranged at a rear side of the at least one filter unit opposed to the igniter-side end face. Hence, the at least one filter unit is advantageously configured so that hot gases and/or hot particles formed by combustion of the first fuel bodies can flow through and, resp., pass the at least one filter unit to initiate an ignition of the additional fuel bodies that is especially time-delayed by the filter unit. Accordingly, the first and the additional fuel bodies may preferably have burning rates and/or dimensions and/or chemical compositions different from each other. In this way, plural combustion chamber portions positioned axially in series and including respective fuel bodies of most diverse properties can be provided. For example, a burning rate and/or gas yield or a gas mass flow to be generated of the different fuel bodies can be utilized to achieve a very specific performance characteristic of the gas generator by means of one single combustion chamber. The fuel bodies may be provided as a fill of individual fuel bodies, wherein they may be in the form of compacted, especially dry-compacted, fuel bodies, extruded bodies, even in the form of broken granules or in the form of a monolithic molded body or in the form of lined-up disks or rings.

Inside the combustion chamber, at least two, preferably three, especially four or more filter units may be arranged which divide the combustion chamber along the longitudinal axis of the gas generator into at least three, preferably four, especially five or more combustion chamber portions having a respective number of respective fuel bodies. Thus, so-to-speak a multi-stage gas generator, i.e., a gas generator having plural fuel bodies or pyrotechnical areas separated from each other can be implemented in one single combustion chamber, without said areas having to be separated into plural individual, especially separated combustion chambers by heavy and, resp., gastight built-in parts. Of advantage, an already afore-described multi-stage gas generator thus can be materialized, and a multi-stage and stepped ignition and/or burning characteristic of the gas generator can be achieved. Advantageously, a required total filtration performance can thus be distributed to plural easily installed filter elements. Hence, a filter capacity utilization or filter load more efficient on the whole is obtained, as hot particles and hot burning gases flow better and, resp., more evenly and more rapidly through plural individual filter elements and a corresponding more efficient total filtering and cooling effect is attained, thus helping prevent a major axial backflow of gases/particles.

In particular, the at least one filter unit may extend substantially perpendicularly to the longitudinal axis of the gas generator and substantially over the entire radial cross-sectional area of the housing of the gas generator, in particular such that two adjacent combustion chamber portions are axially spaced apart from each other by the at least one filter unit. Advantageously, the different fuel bodies of the different combustion chamber portions are thus fully separated from each other so that no detrimental interference with directly abutting different pyrotechnics or fuel bodies can occur. In particular, the at least one filter unit may also be designed to be substantially uncompressible. This offers the advantage that the at least one filter unit acts as a substantially rigid boundary between the different fuel bodies so that, in a finished gas generator, they cannot be shifted or displaced significantly detrimentally any more over the service life thereof but are maintained in an appropriate position. A possibly required volume compensation that compensates for settlement of the fuel bodies over the service life of the gas generator can be materialized by a component separate from the filter unit such as a spring filling body.

Preferably, the at least one filter unit is supported, in the idle state and/or in the activation state of the gas generator, to be movable along the longitudinal axis of the gas generator between a first fuel bed formed by the number of the first fuel bodies and a second fuel bed formed by the number of the additional fuel bodies. As the at least one filter unit is movably supported along the longitudinal axis of the gas generator in this way, different variants of the gas generator can be quickly and inexpensively realized, when manufacturing the gas generator, especially with respect to filling the combustion chamber portions with appropriate fuel bodies. The at least one filter unit need not be installed at a specifically predetermined position, for example there press-fitted or fixed in a combustion chamber or gas generator housing. Rather, the design of the gas generator according to the invention enables one or more filter units to be inserted loosely or quasi "floatingly" between fuel bodies or fuel beds, and thus to respond to different filling heights and filling quantities of fuel bodies quickly and straightforwardly when manufacturing the gas generator. In addition, this design offers the advantage even over the service life of the gas generator that with a settlement of the fuel bodies and/or fuel beds, such as by agitating and shaking operations on the gas generator, the filter unit(s) can appropriately move along in the axial direction so that always an appropriately compact respective fuel bed is maintained. Of preference, the first fuel bodies of the first fuel bed and the additional fuel bodies of the second fuel bed are configured as compacted pellets, especially in cylinder shape, wherein, further preferred, the first fuel bodies have a larger geometry, especially a larger diameter and/or a larger height, than the additional fuel bodies.

The at least one filter unit may also be configured as a subassembly comprising plural individual filter elements, especially a first filter element, a second filter element and a third filter element, which preferably abut against each other along the longitudinal axis of the gas generator. In particular, the at least one filter unit may include areas of different density and, resp., each of the plural individual filter elements may have a different density and/or flow rate for gases and particles, wherein preferably the plural individual filter elements are tightly connected to each other. In this way, one filter unit may be designed individually per se, especially also differently from other filter units, especially as regards its filtering behavior and/or deceleration behavior concerning the permeability of ignition gases/particles for axially successive fuel bodies to be ignited. The performance characteristic of the gas generator thus can be adjusted in even finer steps and more precisely.

The at least one filter unit may include especially one of the following arrangements of filter elements:
expanded sheet metal, wire cloth, wire mesh;
expanded sheet metal, expanded sheet metal, wire mesh;
wire cloth, wire cloth, wire mesh;
perforated sheet, expanded sheet metal, knitted mesh;
perforated sheet, wire cloth, wire mesh.

In particular, the housing of the gas generator may be a compressed gas container and, in the idle state of the gas generator, the combustion chamber can be filled with compressed gas and the at least one filter unit can be surrounded by and penetrated with compressed gas, wherein preferably the compressed gas container is closed by an igniter-side first burst element and a diffusor-side second burst element. In such so-called hybrid gas generator, already during ignition and, resp., an intended combustion of a first number of first fuel bodies, the internal pressure of the entire compressed gas container can be advantageously quickly increased so that the compressed gas container is quickly opened as desired so that burning and, resp., inflating gas can be quickly discharged into the environment of the gas generator, especially into a connected inflatable airbag. In particular, the at least one filter unit does not impede or delay the required increase in the internal pressure of the compressed gas container for the opening thereof. Additionally, when manufacturing such hybrid gas generator, the plural combustion chamber portions separated by the filter unit can be filled with compressed gas in one single filling operation, as the filter unit represents no gastight barrier.

Another independent aspect of the invention relates to an airbag module comprising an airbag inflatable by the gas generator according to the invention and a fastening means for mounting the airbag module on a vehicle. There are resulting advantages similar to those stated already in connection with the gas generator according to the invention.

Another independent aspect of the invention relates to a vehicle safety system, especially for the protection of a person such as a vehicle occupant or pedestrian, comprising an airbag inflatable by the gas generator according to the invention as part of an airbag module, and an electronic control unit by means of which the gas generator according to the invention can be activated when a trigger situation is present. There are resulting advantages similar to those stated already in connection with the gas generator according to the invention.

Another independent aspect of the invention relates to a method for operating a gas generator, especially a gas generator according to the invention. The operating method according to the invention comprises the following steps of:
activating an igniter unit for producing ignition fumes and an increase in pressure inside an ignition chamber;
introducing the ignition fumes into a first combustion chamber portion toward a number of first fuel bodies;
igniting at least part of the number of first fuel bodies and thus generating burning gas and/or burning particles;
directing the burning gas and/or the burning particles out of the first combustion chamber portion through a filter unit into an additional combustion chamber portion having a number of additional fuel bodies, especially along a main flow direction, preferably along a longitudinal axis of the gas generator;
igniting at least part of the number of additional fuel bodies and, thus, generating further burning gas delayed as compared to step c);
opening a second burst member at the end-side of the gas generator and discharging the burning gas of the first and additional combustion chamber portions, preferably via a diffusor, into the environment of the gas generator, especially into an airbag to be inflated.

In particular, in step e), an ignition of at least part of the additional fuel bodies delayed in time, especially significantly in time, with respect to the ignition of at least part of the number of first fuel bodies can advantageously be achieved, which results in a step-like gas generation delayed in time relative to each other by the two combustion chamber portions. Preferably, such step-like gas generation can also be repeated several times inside the combustion chamber by activating successively in time a plurality of combustion chamber portions, especially filled with different or diverse fuel bodies and separated from each other in the longitudinal axis by a corresponding plurality of filter units, and, resp., by igniting the corresponding fuel bodies staggered in time.

In step f), the second burst member at the end-side of the gas generator may be a burst disk made from metal, especially steel, which is configured as a closure element of a compressed gas container of a hybrid gas generator and, consequently, must withstand high pressures of 500 bars, for example, at room temperature in the idle position of the hybrid gas generator. As an alternative, the second burst member at the end-side of the gas generator may be a so-called tamping, a comparatively thinner foil made from metal, especially from copper, aluminum or steel, which in a purely pyrotechnical gas generator serves as closure element of the combustion chamber and, in the idle state of the gas generator, is merely exposed to atmospheric pressure.

In particular, at the beginning of step b), a first burst member closing the ignition chamber and constituting a closure element toward a compressed gas container can be opened. This may be necessary especially in a hybrid gas generator in which the first fuel bodies are arranged inside the compressed gas container. Here, for the ignition of the first fuel bodies, the first burst member must be opened to introduce respective ignition fumes (gases/particles) of the igniter into the compressed gas container and supply them to the first fuel bodies so as to ignite the latter.

BRIEF DESCRIPTION OF THE DRAWINGS

In the following, the invention shall be illustrated in detail by way of exemplary embodiments with reference to the attached schematic figures, wherein.

Hereinafter, the same reference numerals will be used for the same and equally acting components.

DESCRIPTION

Figure 1:
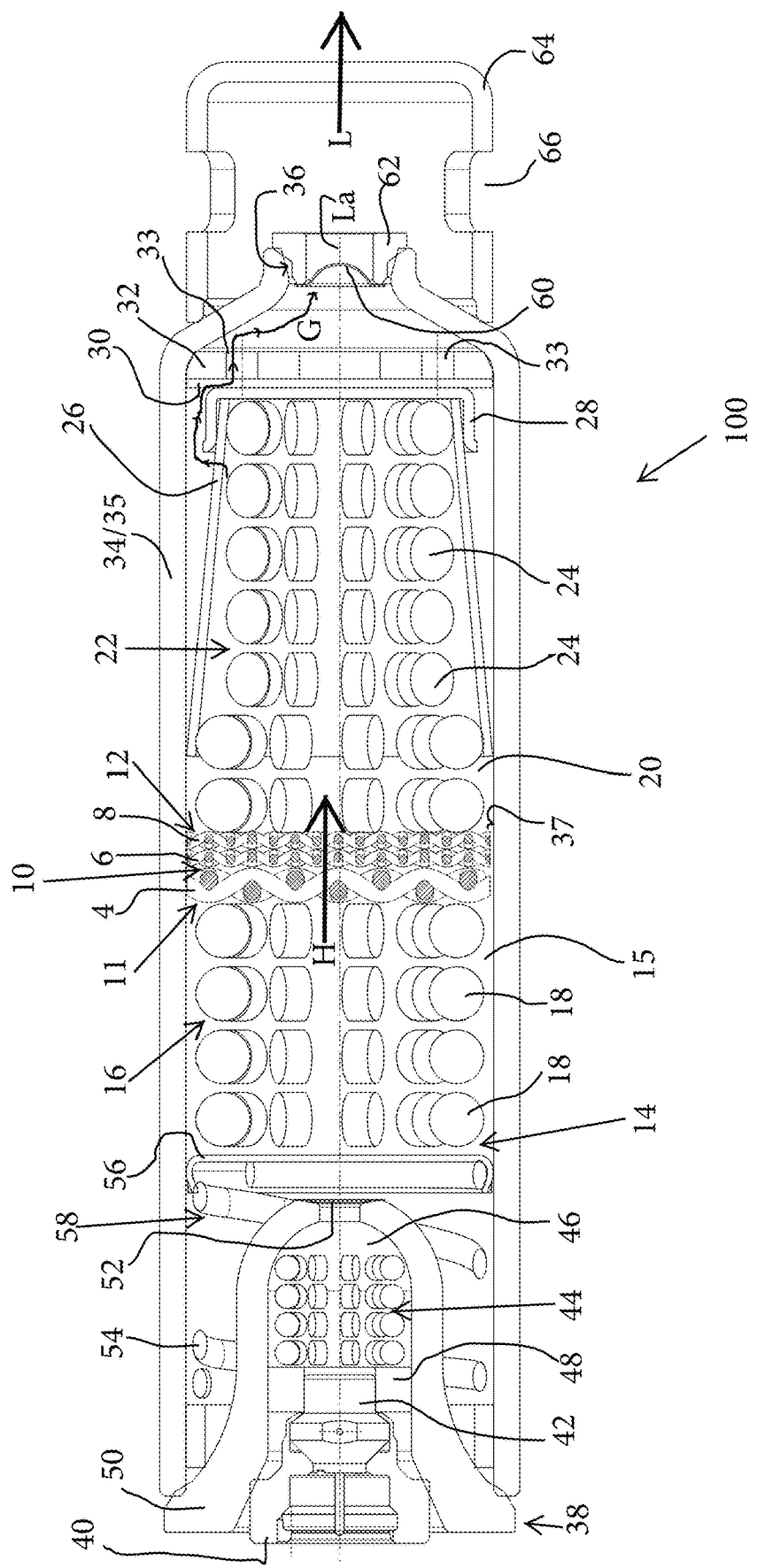
FIG. 1 shows a longitudinal sectional view across a gas generator according to the invention comprising a first embodiment of a filter unit.

FIG. 1 illustrates a longitudinal section across a gas generator 100 having a longitudinal axis La and comprising an exterior housing 34 that has a tubular or substantially cylindrical structure, wherein an igniter unit 38 is arranged on an end face of the housing 34 to close the housing 34 at its end there. A combustion chamber 14 is arranged axially downstream of the igniter unit 38 and has fuel bodies 18, 24 which are configured as first fuel bodies 18 and as additional fuel bodies 24. Inside the combustion chamber 14 a filter unit 10 is arranged that divides the combustion chamber 14 along the longitudinal axis La of the gas generator 100 into a first combustion chamber portion 15 having a number of the first fuel bodies 18 forming a first fuel bed 16 and into an additional combustion chamber portion 20 having an additional number of the additional fuel bodies 24 forming a second fuel bed 22. The filter unit 10 which comprises a first filter element 4, a second filter element 6 and a third filter element 8 is axially positioned between the first fuel bed 16 and the second fuel bed 22 and, accordingly, contacts the first fuel bed 16 with an igniter-side end face 11 and contacts the second fuel bed 22 with a rear side 12 axially opposed thereto. The individual filter elements 4, 6, 8 are configured as substantially disk-shaped elements which are oriented substantially perpendicularly to the longitudinal axis La of the gas generator 100 and which are formed differently especially with regard to their filtration behavior and/or permeability behavior of ignition gases/particles.

The filter unit 10 as shown in FIG. 1 thus comprises three individual filter elements 4, 6, 8 which, during manufacture of the gas generator 100, are either installed axially in series as respective loose single components or are inserted as a pre-mounted subassembly by being fastened, especially welded or press-fitted to each other. The filter unit 10 can be inserted at a radially peripheral small distance from an inner side 37 of the housing 34 of the gas generator 100 and thus with a certain play, or else can be appropriately press-fitted with a small oversize into the housing 34 such that it is supported to be still movable in the longitudinal axis. In both cases of mounting, the filter unit 10 thus is or remains positioned to be movable in the axial direction, especially in the longitudinal direction L of the gas generator 100 but also in the direction opposite thereto. The individual filter elements 4, 6, 8 may be designed differently from each other, as shown in FIGS. 2a-2d and described accordingly in detail further below. In particular, a separate specific gas and/or particle permeability may be predetermined by each individual filter element 4, 6, 8, wherein the gas generator 100 shown in FIG. 1 is not restricted to the number of three individual filter elements 4, 6, 8. It is rather possible to provide only one single, two or a number of more than three individual filter elements arranged axially in series which then form the filter unit 10.

The igniter unit 38 includes an igniter 42 which is installed in and retained or, resp., fixed by an igniter carrier 40. The igniter unit 38 moreover includes a closure cap 50 which is closed, at its bottom area, to be pressure-tight by a first burst element 52, and which is closed, at its opening axially opposed thereto, by the igniter carrier 40, preferably by means of a welded joint. In addition, the igniter unit 38 encloses or encompasses a booster charge 44 accommodated in an ignition chamber 46 and a first filler 48 which axially abuts on the booster charge 44 toward the ignition carrier 40 and is configured as a compressible member, e.g., of silicone foam, to fix the booster charge 44 in position and, resp., to act as an appropriate volume compensating means for the booster charge 44 during manufacture of the gas generator.

The ignition carrier 40 and the closure cap 50 are preferably made from metal, especially from steel, and are connected to each other especially by a welded joint. The closure cap 50 in turn is tightly connected to the exterior housing 34 especially by a welded joint. The afore-mentioned welded joints may be in particular a friction or resistance or laser welding.

A spring filler 58 is provided as a volume compensating means and/or biasing means for the first fuel bodies 18 and the second fuel bodies 24 inside the gas generator 100. The spring filler 58 includes a spring 54 which is especially in the form of a coil spring and a gas flow element 56 which, as an axial and substantially planar closing element, is especially welded or fastened by form and/or force closure to an end face of the spring 54. The gas flow element 56 is in the form of a disk-shaped perforated sheet or expanded metal, for example, and abuts on a part of the first fuel body 18. A large axial portion of the spring 54 encompasses or encloses a correspondingly large axial area of the closure cap 50 in the radial direction and, by means of spring tension of the spring 54 in the axial direction urges toward the first fuel bodies 18, with the first and second fuel beds 16, 22 and thus also the interposed filter unit 10 being fixed and mechanically pretensioned in the axial direction.

The second fuel bed 22 is surrounded by a fuel cage 26 along a major part of its axial extension. The fuel cage 26 is in the form of a gas-permeable tapered hollow, such as made from perforated sheet or expanded metal, and is installed to be oriented such that its wider open end faces the filter unit 10. The opposite narrower open end of the fuel cage 26 is covered to be closed by a combustion chamber bottom 28 which in this case is considered to be sort of a lid or closure for the fuel cage and is a pot-shaped gas-impermeable metal part. The fuel cage 26 assembled with the combustion chamber bottom 28 in this case also has, inter alia, the function of a container for the additional fuel bodies 24 and can be used, during manufacture of the gas generator 100, as a kind of filling funnel or filling receptacle for the fuel bodies 24. An end filter 30 in the form of a substantially disk-shaped component is connected axially downstream of the combustion chamber bottom 28 and is preferably made from metal, especially as knitted mesh, wire mesh, perforated sheet or expanded metal, and forms a filter in addition to the filter unit 10 which is designed to be extremely thin and, resp., space-saving in its axial extension and preferably acts as end filter for particles.

An end plate 32 of metal having plural through-holes 33 is arranged axially downstream of the end filter 30, is substantially configured as a flat disk and is adjacent to a section of the housing 34 of the gas generator 100 which passes from a cylindrical area into a conical area. In this section, the end plate 32 may merely rest or abut on the housing 34 or may also be press-fitted there for better fixation. Accordingly, the contour of the end face of the end plate 32 facing away from the end filter 30 is advantageously adapted to the contour of the housing 34 in the section of the afore-mentioned transition from the cylindrical area to the conical area. The end plate 32 may also be regarded as a termination or terminating element of the combustion chamber 14 in the axial direction.

As indicated already before, the housing 34 of the gas generator 100 includes, at the axial end located opposite to the end of the housing 34 closed by the igniter unit 38, a radially inwardly tapering contour which ends in a discharge opening 36 that can also be regarded as the entire discharge opening for burning gas or gas to be discharged. In the idle state, i.e., before triggering or activation of the gas generator 100, the discharge opening 36 is gas-tightly closed by a closure unit that is formed of a closure member 62 and a second burst element 60 tightly connected, especially welded thereto. The closure member 62 is tightly connected, especially welded, to the housing 34 so that there the discharge opening 36 of the housing 34 is closed by the closure unit formed of the closure member 62 and the burst element 60.

In the illustrated case of FIG. 1, the housing 34 of the gas generator 100 is a compressed gas container 35 which encloses, in the idle state of the gas generator 100, a pressurized gas or gas mixture, such as from the group of argon, helium, oxygen or nitrogen, in particular at a pressure of 550 bars at room temperature. Such pre-stored compressed gas is also referred to as cold gas. Thus, the design of the gas generator 100 according to the invention in FIG. 1 shows a so-called hybrid gas generator. The respective axially opposed gas-tight closures for the compressed gas container 35 represent, on the one hand, the igniter unit 38 and, on the other hand, the closure unit comprising the closure member 62 with the second burst element 60 welded thereto. Hence, inside said two gas-tight closures the compressed gas is provided which especially is thus also provided between the fuel bodies 18, 24 and the filter elements 4, 6, 8 of the filter unit 10 and, resp., appropriately surrounds said components.

A diffusor 64 having outlet openings 66 is tightly connected, axially downstream of the axial end of the housing 34 of the gas generator 100 including the closure member 62, to the housing 34 from outside, wherein the diffusor 64 may be welded to the housing 64, especially by laser welding, friction welding or resistance welding, or may be fixed there by a non-positive and/or positive connection such as a crimping or roll-on connection. Also, the diffusor 64 can be understood to be a quasi-continuous outer housing of the gas generator 100 and, by its outlet openings 66 which may as well be only one single outlet opening 66, enables gas to be discharged from the gas generator 100 to the environment thereof, especially into an airbag to be inflated (not shown) which is connected to the gas generator 100.

The functioning of the gas generator 100 according to the invention is described as follows by way of FIG. 1. When an activation signal is provided which moves the gas generator from an idle position to an activation state or trigger state, initially the igniter 42 as a preferably pre-fabricated component that may comprise one or more pyrotechnical charges (not shown) is activated by an appropriately high pressure being formed inside the igniter 42, which pressure opens or tears open part of the outer envelope of the igniter 42 and releases hot ignition gases or ignition particles which ignite the booster charge 44 and cause combustion thereof. Inside the ignition chamber 46 then an internal pressure is built up which, when a corresponding limit is exceeded, opens or tears open the first burst element 52 to pass hot ignition gases and ignition particles into the combustion chamber 14, especially onto and, resp., toward the axially closest first fuel bodies 18. In doing so, it is also imaginable that the booster charge 44 is not formed separately from the igniter 42, as shown in FIG. 1, but is already integrated in the latter, whereby an igniter 42 of appropriately longer axial length, where necessary, than depicted in FIG. 1 may be resulting. Then a first number of first fuel bodies 18 is ignited and burnt, and a corresponding formation of gas or, resp., burning gas takes place. Said formed gas flows in the direction of the main flow direction H sketched in FIG. 1 which is oriented substantially in parallel to the longitudinal axis La of the gas generator 100. The formed (hot) gas causes the internal pressure inside the combustion chamber to be increased relatively quickly so that, in addition to the pressure of the compressed gas previously stored there prevailing already in the idle state of the gas generator in the combustion chamber, further pressure or excess pressure is formed such that, when a respective pressure threshold is exceeded, the second burst element 60 can be opened. Preferably, initially only a certain portion of the compressed gas previously stored in the pressure tank 35, i.e., a portion of cold gas, is discharged into the diffusor 64 so as to be further passed into an inflatable airbag or airbag module (not shown), wherein advantageously a small mechanical initial load is resulting for the airbag or the airbag module, as in this way a so-to-speak "gentle" initial deployment of the airbag and, resp., "gentle" opening of the airbag module is enabled.

Only after a certain amount of cold gas has flown out of the housing 34 through the discharge opening 66, can hot gas formed by combustion of the fuel bodies so-to-speak flow in and equally exit the housing 34 and the diffusor 64 to completely fill the airbag as intended. Such discharge characteristic of gas from the gas generator and, resp., such pressure-performance curve, which results from the fact that initially only a certain small amount of gas is released from the gas generator and, staggered in time, then a larger amount of gas so-to-speak flows in, is also known by the term "S slope", as already mentioned further above, and is generally deemed to be very beneficial to such gas generator and is achieved by the gas generator according to the invention in a particularly advantageous manner, as will be described further below.

Advantageously, an airbag to be inflated and, resp., an airbag module encompassing the same can initially be filled with gas in a manner gentle on the material in order to make the residual amount of inflation gas, which completely fills the airbag and the airbag module as intended, flow in after a certain period of time.

Consequently, after a first number of first fuel bodies 18 has been ignited and, resp., burnt, the second burst element 60 can advantageously be opened very quickly by appropriate excess pressure in the compressed gas container 35, wherein initially only a portion of cold gas is released from the discharge opening 36. In this case, it may be possible that initially no first hot burning particles from the combustion of the first number of first fuel bodies 18 will act upon the additional fuel bodies 24. Rather, the filter element 10 here acts as a type of temporary barrier or a type of decelerating member for said first hot burning particles, as they are initially generated in the first combustion chamber portion 15 and at first must pass the filter element 10 so as to flow into the additional combustion chamber portion 20 to ignite the second fuel bodies 24 there. Only after a certain period, after hot burning particles which have been produced by combustion of the first fuel bodies 18 have passed the filter element 10 and have entered into the additional combustion chamber portion 20, the additional fuel bodies 24 can be ignited and burnt there so as to generate further hot gas and, resp., burning gas. In this way, it is possible that, at the time of opening of the second burst element 60, either hot burning particles have not yet flown into the second fuel bed 22, or, although hot burning particles have already ignited a small number of additional fuel bodies 24 to ensure a certain stability for an ignition chain and, resp., safe ignition of all fuel bodies 18, 24 involved, no burning gas from the fuel bodies 18, 24 has been capable of spreading so strongly and far toward the end of the compressed gas container 35, however, that it can exit the discharge opening 36 just at the beginning of the opening of the second burst element 60. In all of the afore-described cases, initially only a first small amount of cold gas exits the gas generator 100.

As sketched in FIG. 1, generated gas and burning particles both from the first fuel bodies 18 and from the additional fuel bodies 24 flow initially substantially along an axial direction, as indicated by means of the arrow symbol representing the main flow direction H.

In order to finally pass through the end-side discharge opening 36 of the gas generator 100, the generated gas, or inflation gas for an airbag, continues flowing along a gas flow G whose flow path is symbolically inserted in FIG. 1 by means of a line interspersed with plural arrow symbols. Accordingly, the gas or inflation gas flows from the inner area of the fuel cage 26 through the conical gas-permeable sidewalls thereof in the direction of the end filter 30. In doing so, it is possible, of course, that the gas flows over the entire longitudinal extension of the fuel cage 26 from the interior area thereof, where a major part of the additional fuel bodies 24 are stored, through the gas-permeable sidewalls of the fuel cage 26 to the exterior area thereof in order to flow, in the space formed by the fuel cage 26 and the inner side 37 of the housing 34 of the gas generator 100, in the direction of the end filter 30.

After that, the generated gas can flow through the end filter 30, causing the gas to be further cooled and, resp., filtered, so that afterwards it can flow through the through-holes 33 and further through the discharge opening 36 into the interior of the diffusor 64, because the second burst membrane 60 has already been opened by excess pressure, as described in the foregoing. The generated gas now can mix in the interior of the diffusor 64 with the cold gas or, resp., a residual amount of the cold gas which is still present at that time in the compressed gas container 35 and which flows, substantially simultaneously with the generated gas, equally through the discharge opening 36 into the interior of the diffusor 64, and then can flow out of the diffusor 64 through the outlet openings 66 thereof into the exterior area of the gas generator 100 and, resp., into an inflatable airbag (not shown). Accordingly, the diffusor 64 also serves as a mixing chamber for generated gas and pre-stored compressed gas (cold gas).

As an alternative to that, it is also possible that the first and additional fuel bodies 18, 24 are burnt so quickly that also just as quickly an appropriately formed gas (burning gas) is formed at the end of the compressed gas container 35 or has flown there so that, when the second burst element 60 is opened, a substantially simultaneous outflow of pre-stored cold gas and formed gas (burning gas) through the discharge opening 36 can take place.

As a further alternative, it is possible that the gas generator according to the invention includes no pressurized gas (cold gas) and thus is provided as a purely pyrotechnical gas generator. In this case, deviating from the representation in FIG. 1, it is not necessary to design the housing 34 of the gas generator as a pressure-tight or pressure-stable compressed gas container 35 which must hold a previously stored compressed gas already in the idle state of the gas generator 100. Rather, in this case it is possible, for example, that the two burst elements 52, 60 are merely designed as known so-called tampings which may be made, e.g., from thin metal foils which merely represent a certain sealing of the fuel bodies 18, 24 against the exterior area of the gas generator 100 and are bonded to the adjacent components by an adhesive bond.

Here too, an afore-described performance curve of the gas generator with the advantageous "S slope characteristic" can be achieved.

As in this case the first fuel bed 16 is equally separated from the second fuel bed 24 by the filter unit 10, the "S slope characteristic" can be achieved even without the aid or the presence of pre-stored compressed gas (cold gas).

In general, the first fuel bodies 16 may exhibit a different burning characteristic as compared to the additional fuel bodies 24, as, for example, in each case different geometries, dimensions, burning rates and/or chemical compositions are used for the fuel bodies 18, 24. This fact is independent of whether the gas generator 100 according to the invention is a hybrid gas generator or a purely pyrotechnical gas generator.

In general, also more than only two fuel beds 16, 22 are imaginable which are installed axially in series in the gas generator 100 with a mutual separation by plural respective filter units 10 according to the basic design as shown in FIG. 1. In particular, here two or three filter elements 10 are imaginable which appropriately space apart or separate three or four fuel beds from each other.

It is noted for all afore-described embodiments of the gas generator 100 according to the invention that decisive advantages can be achieved by the way of mounting and, resp., the position of the filter unit 10 in the gas generator 100.

The filter unit 100 is movably supported, especially along the longitudinal axis La of the gas generator 100, advantageously movably in both directions, quasi as a loose, so-to-speak "floating" component between the two fuel beds 16, 22. This offers the advantages mentioned at the outset both during manufacture of the gas generator 100 and for the intended function (activation) of the gas generator 100.

When manufacturing the gas generator 100 according to the invention, different fills, filling quantities and/or filling tolerances of different fuel bodies 18, 24 can thus be dealt with in an extremely flexible and inexpensive manner. Especially, by the filter unit 10 a number of plural fuel beds are arranged axially in series, without a separation between the plural fuel beds having to be arranged at a fixedly predetermined position. For the function of such gas generator and, resp., for the combustion of the plural fuel beds, the filter unit 10 is supported to be movable between the fuel beds and so-to-speak adapts "automatically and self-adjusting" to the dynamic burning processes of the different fuel beds. What is especially meant here is that generally during a combustion (a conversion) of a fuel bed comprising plural fuel bodies with progressive time a corresponding reduced total volume of the fuel bed is resulting—quasi a reduction of volume by burnt fuel bodies that were converted into generated gas. During such dynamic burning process, the filter unit 10 is thus appropriately displaced along in the axial direction so as to "automatically react" so-to-speak to the loss of volume of the burnt fuel beds.

In FIGS. 2a to 2d, various embodiments or designs of different filter units 10 are shown. The respective filter units 10 are made of plural disk-shaped layers that are lined up and, resp., positioned axially in series as individual filter elements 4, 6 and 8 with respect to FIGS. 2*a*-*b* and 4 and 6 with respect to FIG. 2*c*-*d*. It applies to each of the filter units 10 shown here that it includes a first filter element 4 which, in the mounted state of the filter unit 10 in the gas generator 100, is directed in the direction of the igniter unit 38 and thus constitutes the filter element which abuts, with its igniter-side end face 11, against a part of the first fuel body 18.

Preferably, the respective first filter element 4 is structured as a wire cloth. In addition, the respective first filter element 4 preferably constitutes the filter element which, as compared to the remaining filter elements of the filter unit 10, has the heaviest structure and thus also constitutes sort of a first coarse filter that is designed to be especially very robust for or against hot particles and burning gases. This is indicated in FIGS. 2*a*-2*d* by a shown higher material thickness for the individual wires forming the wire cloth of the shown filter elements 4.

Figure 2A:
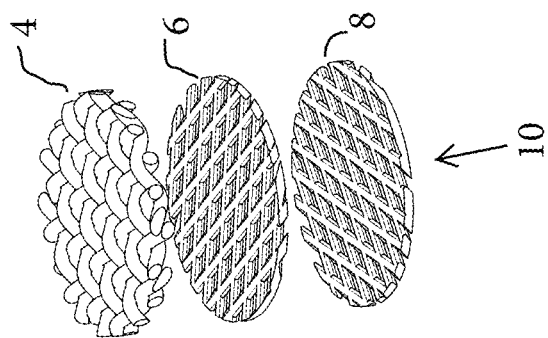
FIGS. 2a-2d show an enlarged view of a filter unit of the gas generator according to the invention as set forth in FIG. 1 comprising individual filter elements.

Concretely speaking, the filter unit 10 as shown in FIG. 2*a* is made from a heavy first filter element 4, especially a wire cloth or wire mesh, followed by a second filter element 6 and a third filter element 8 both of which preferably include an expanded sheet metal.

Figure 2B:
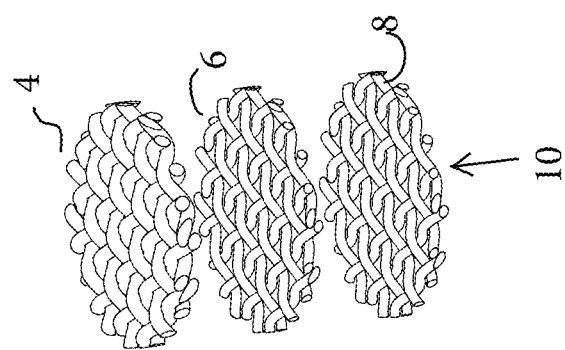

The filter unit 10 shown in FIG. 2*b* includes, apart from a heavy first filter element 4, especially a wire cloth or wire mesh, two further filter elements, namely second and third filter elements 6 and 8, both of which are preferably configured as a wire mesh of lower material strength than the first filter element 4.

Figure 2C:
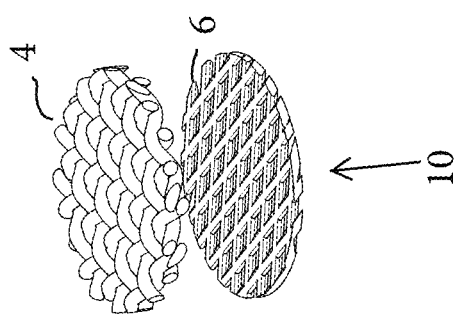

The filter unit 10 shown in FIG. 2*c* includes, apart from a heavy first filter element 4, especially a wire cloth or wire mesh, merely one further filter element, namely a second filter element 6, which is preferably configured as an expanded sheet metal.

Figure 2D:
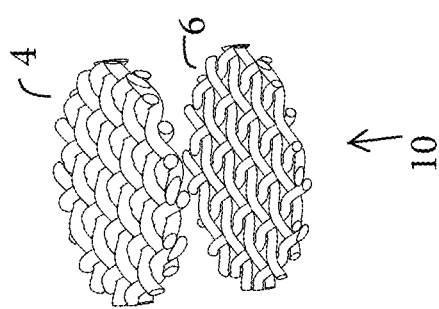

The filter unit 10 shown in FIG. 2*d* includes, apart from a heavy first filter element 4, especially a wire cloth or wire mesh, likewise only one further filter element, namely a second filter element 6, which in this case preferably includes a wire mesh of lower material strength than the first filter element 4.

For the gas generator 100, also filter units having only one single first filter element 4 or else filter units having a larger number than three filter elements are considered as filter unit 10. Advantageously, in the case of plural filter elements, they are already combined, especially welded, or positively and/ or non-positively connected to each other, to form a pre-mounted subassembly, viz. the filter unit 10, before they are mounted in the gas generator.

The filter units 10 shown in FIGS. 2*a*-2*d* are merely meant to be a possible selection of filter units for the gas generator 100 according to the invention. Thus, a filter unit 10 for the gas generator 100 according to the invention may be made from a plurality of individual filter elements all of which are configured differently relative to each other or only partly differently relative to each other. Each combination of individual filter elements which are made from expanded sheet metal, wire mesh, perforated sheet or knitted mesh is imaginable.

Consequently, for a filter element 10 such as illustrated in FIGS. 2*a*-2*d* which is mounted in the gas generator 100 according to the invention, it is noted that such a layer-type structure helps address quite specifically the respective needs as regards filtering in a gas generator 100 by providing appropriately layered different ranges of density and/or flow rate for gases and particles especially by said structure so as to bring about an optimized adapted filtering behavior and/or deceleration behavior with respect to burning times for different fuel bodies 18, 24 in the gas generator for the entire filter unit 10. Of advantage, in this way the step-like burning characteristic or "S slope characteristic" of the different fuel bodies in the different fuel beds described already in the foregoing can be achieved.

REFERENCE NUMERALS 4 first filter element
6 second filter element
8 third filter element
10 filter unit
11 igniter-side end face
12 rear side
14 combustion chamber
15 first combustion chamber portion
16 first fuel bed
18 first fuel body
20 combustion chamber portion
22 second fuel bed
24 additional fuel bodies
26 fuel cage
28 combustion chamber bottom
30 end filter
32 end plate
33 through-hole
34 housing
35 compressed gas container
36 discharge opening
37 inner side
38 igniter unit
40 igniter carrier
42 igniter
44 booster charge
46 ignition chamber
48 first filler
50 closure cap
52 first burst element
54 spring
56 gas flow element
58 spring filler
60 second burst element
62 closure member
64 diffusor
66 outlet opening
100 gas generator
La longitudinal axis
L longitudinal direction
H main flow direction
G gas flow

The invention claimed is:

1. A gas generator for a vehicle safety system, comprising:
a housing comprising a combustion chamber and a rupturable second burst element that closes an outlet of the combustion chamber;
an igniter unit comprising a booster charge and an igniter for igniting the booster charge;
at least one filter unit that divides the combustion chamber along a longitudinal axis of the gas generator into at least two combustion chamber portions comprising a first combustion chamber portion and a second combustion chamber portion, wherein the first combustion chamber portion is filled with a first number of first fuel bodies, and the second combustion chamber portion is filled with an additional number of additional fuel bodies; and a compressed gas that fills empty space within the combustion chamber;

wherein the igniter is configured to ignite the booster charge, which creates combustion products directed into the first combustion chamber portion to rapidly ignite the first fuel bodies which generate combustion gases that cause a pressure of the compressed gas in the combustion chamber to increase and rupture the second burst element, which allows at least a portion of the compressed gas to be discharged initially from the outlet;

wherein the combustion gases from combustion of the first fuel bodies ignite the additional fuel bodies, and wherein the at least one filter unit is configured to delay the ignition of the additional fuel bodies in the second combustion chamber portion, which imparts a delay in the generation of combustion gasses by the additional fuel bodies so that a mass flow characteristic of the combustion gasses generated by the first fuel bodies and the combustion gases generated by the additional fuel bodies proceeds in a step-like manner, and wherein the delays in the ignition of the additional fuel bodies and the generation of the combustion gasses by the additional fuel bodies also allow for the compressed gas to be initially discharged from the outlet.

2. The gas generator according to claim 1, wherein the at least one filter unit is configured to be permeable to at least one of gas and particles, wherein at least several of the first fuel bodies are arranged on an igniter-side end face of the at least one filter unit and at least several of the additional fuel bodies are arranged on a rear side of the at least one filter unit opposed to the igniter-side end face, and wherein the first and the additional fuel bodies have at least one of burning rates, dimensions, and chemical compositions that are different from each other.

3. The gas generator according to claim 1, wherein inside the combustion chamber at least two filter units are arranged which divide the combustion chamber along the longitudinal axis of the gas generator into at least three combustion chamber portions having a particular number of particular fuel bodies.

4. The gas generator according to claim 1, wherein the at least one filter unit extends substantially perpendicularly to the longitudinal axis of the gas generator and substantially over the entire radial cross-sectional area of the housing of the gas generator, such that two adjacent combustion chamber portions are axially spaced apart from each other by the at least one filter unit.

5. The gas generator according to claim 4, wherein the at least one filter unit is formed to act as a rigid boundary between the first and second combustion chambers that helps prevent shifting or displacement of the fuel bodies in the first and second combustion chambers over a service life of the gas generator.

6. The gas generator according to claim 1, wherein the at least one filter unit is supported, in at least one of an idle state and an activation state of the gas generator, to be movable along the longitudinal axis of the gas generator between a first fuel bed formed by the first fuel bodies and a second fuel bed formed by the additional fuel bodies.

7. The gas generator according to claim 1, wherein the at least one filter unit is configured as a subassembly comprising plural individual filter elements, including a first filter element, a second filter element and a third filter element, which abut against each other along the longitudinal axis of the gas generator.

8. The gas generator according to claim 7, wherein the at least one filter unit has areas of different density and the plural individual filter elements have at least one of different densities and different flow rates for gases and particles, wherein the plural individual filter elements are tightly connected to each other.

9. The gas generator according to claim 8, wherein the at least one filter unit includes one of the following arrangements of filter elements:
 a) expanded sheet metal, wire cloth, wire mesh;
 b) expanded sheet metal, expanded sheet metal, wire mesh;
 c) wire cloth, wire cloth, wire mesh;
 d) perforated sheet, expanded sheet metal, knitted wire;
 e) perforated sheet, wire cloth, wire mesh.

10. The gas generator according to claim 1, wherein the housing of the gas generator is in the form of a compressed gas container and wherein, in an idle state of the gas generator, the at least one filter unit is surrounded and penetrated by the compressed gas, wherein the compressed gas container is closed by an igniter-side first burst element and the second burst element on a diffusor side.

11. An airbag module comprising a gas generator, an airbag inflatable by the gas generator and a fastening means for mounting the airbag module on a vehicle, wherein the gas generator is configured according to claim 1.

12. A vehicle safety system for the protection of at least one of a vehicle occupant and a pedestrian, comprising a gas generator, an airbag inflatable by the gas generator as part of an airbag module, and an electronic control unit configured to activate the gas generator in response to a trigger situation, wherein the gas generator is configured according to claim 1.

13. A method for operating a gas generator according to claim 1, comprising the following steps of:
 a) activating the igniter unit for generating ignition fumes and an increase in pressure inside an ignition chamber;
 b) introducing the ignition fumes into the first combustion chamber portion toward the first fuel bodies;
 c) igniting at least part of the first fuel bodies and thus generating the combustion gases from the combustion of the first fuel bodies;
 d) directing combustion gases from the combustion of the first fuel bodies out of the first combustion chamber portion, through the at least one filter unit, into the second combustion chamber portion having the additional fuel bodies along a main flow direction and along a longitudinal axis of the gas generator;
 e) igniting at least part of the number of the additional fuel bodies and thereby generating the combustion gases from the combustion of the first fuel bodies and additional fuel bodies delayed in time compared to step c);
 f) opening the second burst element on the end side of the gas generator and discharging the combustion gases from the combustion of the first fuel bodies and the additional fuel bodies, via a diffusor, into an airbag.

14. The method according to claim 13, wherein at the beginning of step b), a first burst element, which closes the ignition chamber sealing the booster charge outside the combustion chamber, and which constitutes a closure element toward the combustion chamber, is opened.

15. The gas generator according to claim 1, wherein the igniter unit comprises a closure cap that supports the igniter and forms a chamber in which the booster material is supported, and a first burst element that seals the booster material inside the chamber and isolated from the combustion chamber.

16. The gas generator according to claim 15, wherein the igniter unit further comprises a compressible filler disposed between the igniter and the booster, the filler being compressible to fix the booster in position in the closure cap.

\* \* \* \* \*